(12) United States Patent
Okada

(10) Patent No.: US 7,412,243 B2
(45) Date of Patent: Aug. 12, 2008

(54) MOBILE COMMUNICATION SYSTEM AND LOAD DISTRIBUTION METHOD OF MULTIPLE FREQUENCIES IN THE SAME

(75) Inventor: Masaaki Okada, Tokyo (JP)

(73) Assignee: NEC Corporation (JP)

( * ) Notice: Subject to any disclaimer, the term of this patent is extended or adjusted under 35 U.S.C. 154(b) by 1034 days.

(21) Appl. No.: 10/457,365

(22) Filed: Jun. 10, 2003

(65) Prior Publication Data

US 2003/0227897 A1 Dec. 11, 2003

(30) Foreign Application Priority Data

Jun. 11, 2002 (JP) ............................... 2002-169786

(51) Int. Cl.
*H04Q 7/20* (2006.01)
(52) U.S. Cl. ..................... 455/450; 455/452.1; 455/453
(58) Field of Classification Search .......... 455/450–453
See application file for complete search history.

(56) References Cited

U.S. PATENT DOCUMENTS

| | | | |
|---|---|---|---|
| 5,280,630 A | | 1/1994 | Wang |
| 5,790,534 A * | | 8/1998 | Kokko et al. ................. 370/335 |
| 5,815,811 A * | | 9/1998 | Pinard et al. ................. 455/434 |
| 6,049,717 A * | | 4/2000 | Dufour et al. ................. 455/446 |
| 6,253,087 B1 * | | 6/2001 | Corbett ....................... 455/450 |
| 6,301,233 B1 | | 10/2001 | Ku et al. |
| 6,317,598 B1 * | | 11/2001 | Wiesen et al. ................. 455/443 |
| 6,317,600 B1 * | | 11/2001 | Salonaho et al. ............. 455/453 |
| 6,321,089 B1 * | | 11/2001 | Han ............................ 455/438 |
| 6,374,112 B1 * | | 4/2002 | Widegren et al. ......... 455/452.2 |
| 6,611,506 B1 * | | 8/2003 | Huang et al. ................. 370/329 |
| 7,042,988 B2 * | | 5/2006 | Juitt et al. ................. 379/88.17 |
| 7,106,704 B2 * | | 9/2006 | Marjelund et al. ....... 370/310.1 |

FOREIGN PATENT DOCUMENTS

| | | |
|---|---|---|
| JP | 8-265834 | 10/1996 |
| JP | 10-322760 | 12/1998 |
| JP | 11-136729 | 5/1999 |
| JP | 2001-333458 | 11/2001 |
| KR | 2002-0036056 | 5/2002 |

OTHER PUBLICATIONS

Korean Office Action dated Sep. 8, 2005 with English translation of relevant portion.
Katzela et al., "Channel Assignment Schemes for Cellular Mobile Telecommunication Systems", A Comprehensive Survey, IEEE Personal Communications, pp. 10-31 (Jun. 1996).

* cited by examiner

*Primary Examiner*—Duc M Nguyen
(74) *Attorney, Agent, or Firm*—Dickstein, Shapiro, LLP.

(57) ABSTRACT

A radio network controller 11 for controlling a base station in a CDMA or W-CDMA mobile communication system includes a state measurement part 21, a call control processing part 31, and a frequency load distribution processing part 41. The frequency load distribution processing part 41 is provided with a frequency state change processing 42 for updating each frequency's state data 44 and next assignment management data 45 by referring a frequency state change notice notified when a state is changed by call control, and frequency assignment control processing 43 for selecting a frequency by referring to the updated next assignment management data and for returning a frequency assignment response, in response to a frequency assignment request transmitted from the call control processing part. With this constitution, load distribution of multiple frequencies is achieved by deriving a next assigned frequency on the basis of operating states of each frequency.

12 Claims, 11 Drawing Sheets

FREQUENCY STATE CHANGE NOTICE

| TOTAL NUMBER OF CHANGES x | CELL NUMBER | FREQUENCY | INCOMING INTERFERENCE QUANTITY | OUTGOING TOTAL TRANSMISSION POWER | CHANGE INFORMATION | ... | CELL NUMBER | FREQUENCY | INCOMING INTERFERENCE QUANTITY | OUTGOING TOTAL TRANSMISSION POWER | CHANGE INFORMATION |
|---|---|---|---|---|---|---|---|---|---|---|---|
| | ⎵———————————— 1 ————————————⎵ | | | | | | ⎵———————————— x ————————————⎵ | | | | |

CHANGE INFORMATION 0: +1 CH. INCREMENT, 1: -1. DECREMENT
0xff: NON-OPERABLE BECAUSE OF FAILURE OF CORRESPONDING FREQUENCY
0xfe: OPERABLE BECAUSE OF FAILURE RESTORATION OF CORRESPONDING FREQUENCY
0xef: CONGESTION OF CORRESPONDING FREQUENCY GENERATED
0xee: CONGESTION OF CORRESPONDING FREQUENCY RESTORED

FREQUENCY ASSIGNMENT REQUEST

| CELL NUMBER | REQUEST LEVEL | FREQUENCY | TYPE OF SERVICE |
|---|---|---|---|

FREQUENCY ASSIGNMENT RESPONSE

| OK/NG | FREQUENCY |
|---|---|

| CELL NUMBER / FREQUENCY | C1 | | | C1 | | | C1 | | |
|---|---|---|---|---|---|---|---|---|---|
| | INCOMING INTERFERENCE QUANTITY | OUTGOING TOTAL TRANSMISSION POWER | INCOMING AND OUTGOING TOTAL QUANTITY | INCOMING INTERFERENCE QUANTITY | OUTGOING TOTAL TRANSMISSION POWER | INCOMING AND OUTGOING TOTAL QUANTITY | INCOMING INTERFERENCE QUANTITY | OUTGOING TOTAL TRANSMISSION POWER | INCOMING AND OUTGOING TOTAL QUANTITY |
| f1 | x11 | y11 | z11 | x21 | y21 | z21 | x31 | y31 | z31 |
| f2 | x12 | y12 | z12 | x22 | y22 | z22 | x32 | y32 | z32 |
| f3 | x13 | y13 | z13 | x23 | y23 | z23 | x33 | y33 | z33 |

INCOMING AND OUTGOING TOTAL QUANTITY z = (INCOMING INTERFERENCE QUANTITY x /INCOMING INTERFERENCE THRESHOLD QUANTITY) + (OUTGOING TOTAL TRANSMISSION POWER y /OUTGOING MAXIMUM TRANSMISSION POWER)

NEXT ASSIGNMENT MANAGEMENT DATA (PACKET SERVICE)

| PRIORITY ORDER / CELL NUMBER | C1 | | C2 | | C3 | |
|---|---|---|---|---|---|---|
| PRIORITY 1 | f1 | on | f2 | on | f3 | on |
| PRIORITY 2 | f2 | on | f1 | on | f1 | on |
| PRIORITY 3 | f3 | on | f3 | on | f2 | on |

NEXT ASSIGNMENT MANAGEMENT DATA (NON-PACKET SERVICE)

| PRIORITY ORDER / CELL NUMBER | C1 | | C2 | | C3 | |
|---|---|---|---|---|---|---|
| PRIORITY 1 | f1 | on | f2 | on | f3 | on |
| PRIORITY 2 | f2 | on | f1 | on | f1 | on |
| PRIORITY 3 | f3 | on | f3 | on | f2 | on |

OPERABLE FLAG
OPERABLE : on, NON-OPERABLE: off

OPERABLE FLAG
OPERABLE : on, NON-OPERABLE: off

FIG. 8B

MOBILE COMMUNICATION SYSTEM AND LOAD DISTRIBUTION METHOD OF MULTIPLE FREQUENCIES IN THE SAME

BACKGROUND OF THE INVENTION

The present invention relates to a mobile communication system and a load distribution method of multiple frequencies in the system, and more particularly, to a CDMA (Code Division Multiple Access) or W-CDMA (Widebanded-CDMA) mobile communication system and a load distribution method of multiple frequencies in the system.

Recently, a CDMA mobile communication system has been widespread because it has such features as large subscriber capacity, asynchronous access capability, strong resistance to mutual interference with other systems, and high concealability.

The conventional CDMA mobile communication system performing frequency assignment will be described referring to FIG. 1.

In FIG. 1, each of base stations: BTS61, BTS62, and BTS63 has three carrier frequency bands of frequencies 71, 72, and 73. Each of these frequencies transmits respectively different pilot signals, and congestions or failures of the frequencies are detected and notified to a radio network controller 11.

Each of mobile units 81 to 83 of CDMA system is able to use the frequencies 71 to 73 as a carrier frequency and has a Pilot search function for different frequencies. Each mobile unit searches the pilot signal in order to detect the base station most appropriate for communication, to thereby notify the radio network controller 11 of a shift regarding the base station when a cell switches.

A present-day frequency assignment method does not focus on frequencies, but determines the frequency on the basis of a Pilot search result of the mobile unit. A carrier terminal using a pilot carrier cell exceptionally performs hard hand-off at times such that the radio network controller 11 designates the frequency. However, even in the case that multiple frequencies cover the same cell as usual, the radio network controller 11 merely examines the frequency selected by the mobile unit whether it is available or not by performing failure checking 37 to failure information 26.

The frequency assignment method in the conventional CDMA mobile communication system as described above has a first problem of inability to distribute loads to each frequency because of not consulting state changes of frequencies when assigning them, and a second problem of inability to consider load distribution in the unit of frequencies due to mobile unit-led frequency assignment.

It is, therefore, an object to provide a mobile communication system capable of distributing loads to multiple frequencies and a load distribution method.

SUMMARY OF THE INVENTION

A mobile communication system of the present invention is a CDMA or W-CDMA mobile communication system which comprises a mobile unit, a base station having a plurality of carrier frequency bands, and a radio network controller controlling the base station.

To achieve the foregoing objects, the radio network controller comprises a state measurement part, a control processing part, and a frequency load distribution processing part. The frequency load distribution processing part is provided with frequency state change processing means and frequency assignment control processing means. The frequency state change processing means updates pre-formed each frequency's state data and next assignment management data by referring a frequency state change notice transmitted from the state measurement part. The frequency assignment control processing means selects a frequency by referring to the updated next assignment management data and returns a frequency assignment response, in response to a frequency assignment request added with current processing information that is transmitted from the call control processing part.

In the present invention, the state measurement part may be so designed as to extract elements that change the frequency from processing contents of basic call controls including call connection, call disconnection, branch addition, branch deletion, and frequency switching in the call control processing part, and to form the frequency state change notice by referring to the extracted elements.

Furthermore, in the present invention, each frequency's operating channel number data may be used as the each frequency's state data.

Moreover, in the present invention, the state measurement part may be so designed as to comprise means for receiving an incoming interference quantity and an outgoing transmission power regarding multiple frequencies from the base station and to form the frequency state change notice by referring to the incoming interference quantity and the outgoing transmission power received by the receiving means.

Moreover, in the present invention, each frequency's cell capacity data including the incoming interference quantity, the outgoing transmission power, and an incoming and outgoing total value calculated by a prescribed expression may be used as the each frequency's state data.

Furthermore, in the present invention, the frequency load distribution processing part may be so designed as to manage frequency assignment on an incoming and outgoing basis by using the incoming interference quantity, the outgoing transmission power, and the incoming and outgoing total value, and to manage next assigned frequencies in accordance with types of services.

Furthermore, a load distribution method of the present invention is a load distribution method of multiple frequencies in a CDMA or W-CDMA mobile communication system which comprises a mobile unit, a base station having a plurality of carrier frequency bands, and a radio network controller controlling the base station, where the radio network controller executes at least the following steps: a step of forming a frequency state change notice based on state changes of frequencies; a step of updating pre-formed each frequency's state data by referring to the frequency state change notice; a step of updating pre-formed next assignment management data by referring to the updated each frequency's state data; a step of selecting the frequency by referring to the updated next assignment management data and returning a frequency assignment response when a frequency assignment request added with current processing information is transmitted from a call control processing part; and a step of assigning the frequency by referring to the frequency assignment response.

Thus, according to the present invention, frequencies are assigned on the basis of states thereof, which allows the distribution of loads of each frequency band, thereby preventing deterioration in service quality resulted from congestion generated in only a specific frequency.

BRIEF DESCRIPTION OF THE DRAWINGS

FIG. 8B is a diagram showing in detail signals and data in a load distribution processing flow according to the second embodiment of the present invention.

DESCRIPTION OF THE PREFERRED EMBODIMENTS

To describe the present invention in more detail, the accompanied drawings will be referred.

A mobile communication system according to the present invention is characterized by, in its preferred embodiment, allowing load distribution of multiple frequencies by deriving a next assigned frequency based on operation states of each frequency by a radio network controller (RNC) in a CDMA mobile communication system that applies one frequency to code division multiplexing processing.

The description hereinafter will be made with reference to drawings.

Figure 1:
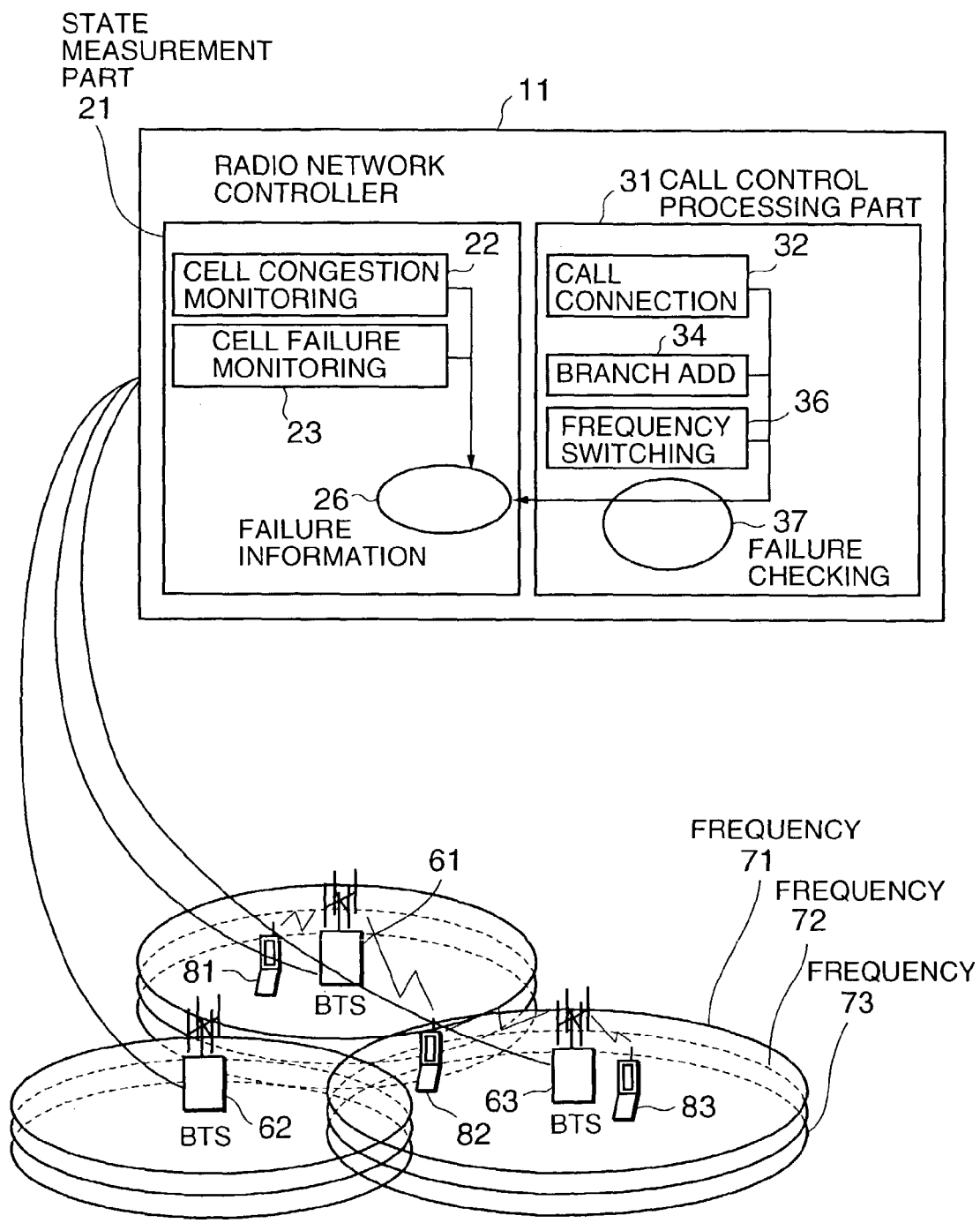
FIG. 1 is a diagram showing a configuration of the conventional CDMA mobile communication system.
Figure 2:
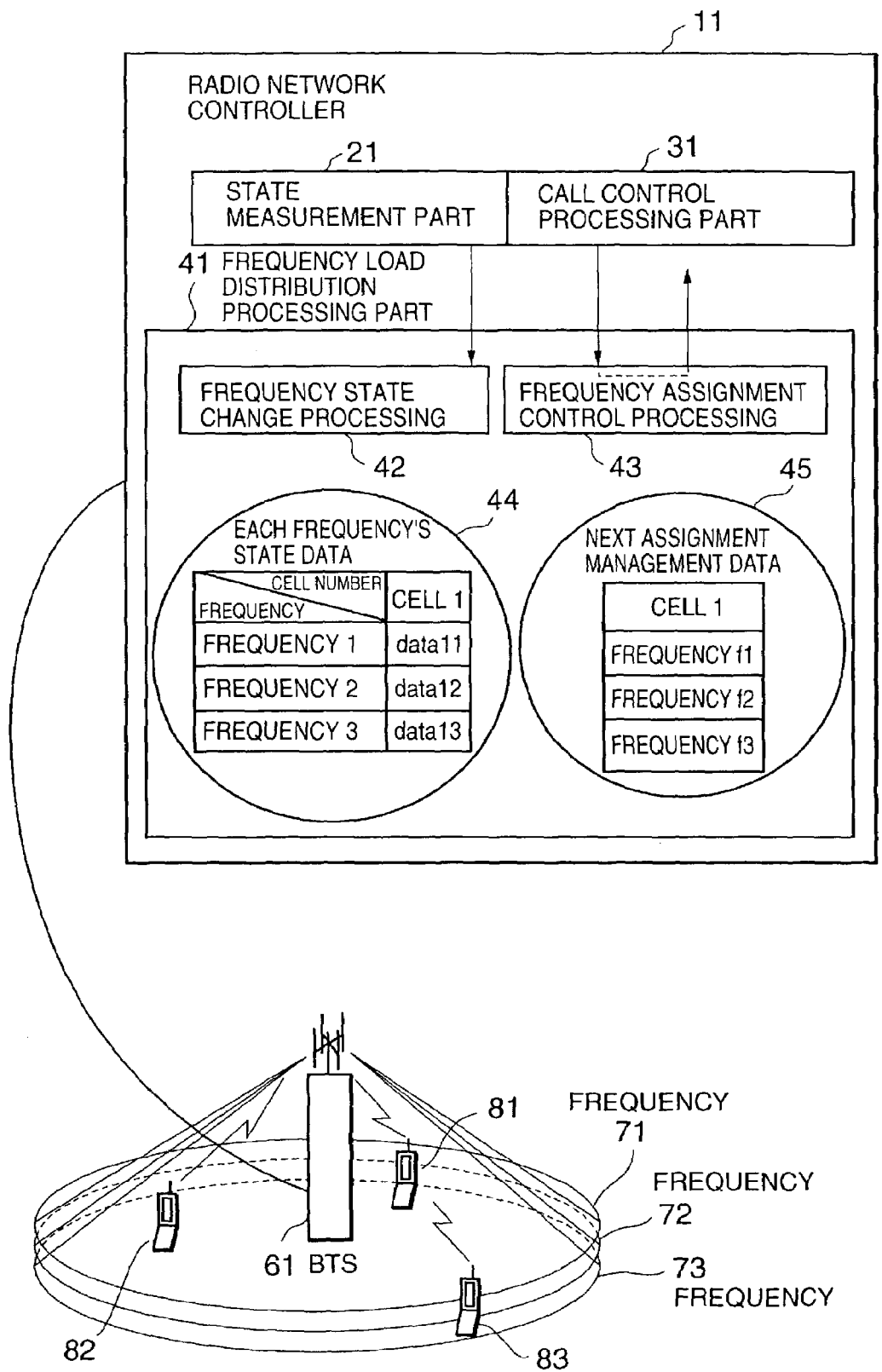
FIG. 2 is a diagram showing a configuration of a CDMA mobile communication system according to one embodiment of the present invention.

FIG. 2 is a diagram showing the entire configuration of the CDMA mobile communication system according to one embodiment of the present invention. In FIG. 2, a radio network controller 11 of the CDMA mobile communication system has, in subordination thereto, a BTS 61 covering an area by multiple frequencies.

The radio network controller 11 has the following two functions. One is a function of notifying a frequency load distribution processing part 41 of frequency state changes from a state measurement part 21. The other one is a function of transmitting an inquiry request and assignment response of a next assigned frequency between a call control processing part 31 and the frequency load distribution processing part 41 when the call control processing part 31 is required to assign the frequency.

The call control processing part 31 performs trunk set/release processing and branch add/delete processing when communication is started/terminated and is handed over. At the time of setting a trunk or adding a branch, the call control processing part 31 transmits a frequency assignment request added with current processing information to the frequency load distribution processing part 41. Also, the call control processing part 31 notifies the frequency load distribution processing part 41 of frequency state change information in response to each call processing.

The frequency load distribution processing part 41 comprises frequency state change processing 42 and frequency assignment control processing 43. The frequency state change processing 42 updates each frequency's state data 44 and next assignment management data 45 on the basis of the frequency state change information notified from the state measurement part 21. The frequency assignment control processing 43 assigns an appropriate frequency in response to the frequency assignment request from the call control processing part 31 on the basis of the processing information added to the request.

In the method of the present invention, performed are extraction of frequency state changes from the state measurement part 21, derivation of the next assigned frequency on the basis of both information of the state change information notified to the frequency load distribution processing part 41 and carrier frequency information of each area held in advance by the radio network controller 11, and assignment of frequencies appropriate to a communication state. These operation functions allow distribution of loads to each frequency, prevent a congestion condition occurred only in a specific frequency, suppress a state of switching carrier frequencies at the time of moving into neighboring cells to the utmost, and enable to provide high quality services.

Examples of the embodiment of the present invention will be described in more detail with reference to drawings.

First Embodiment

Figure 6A:
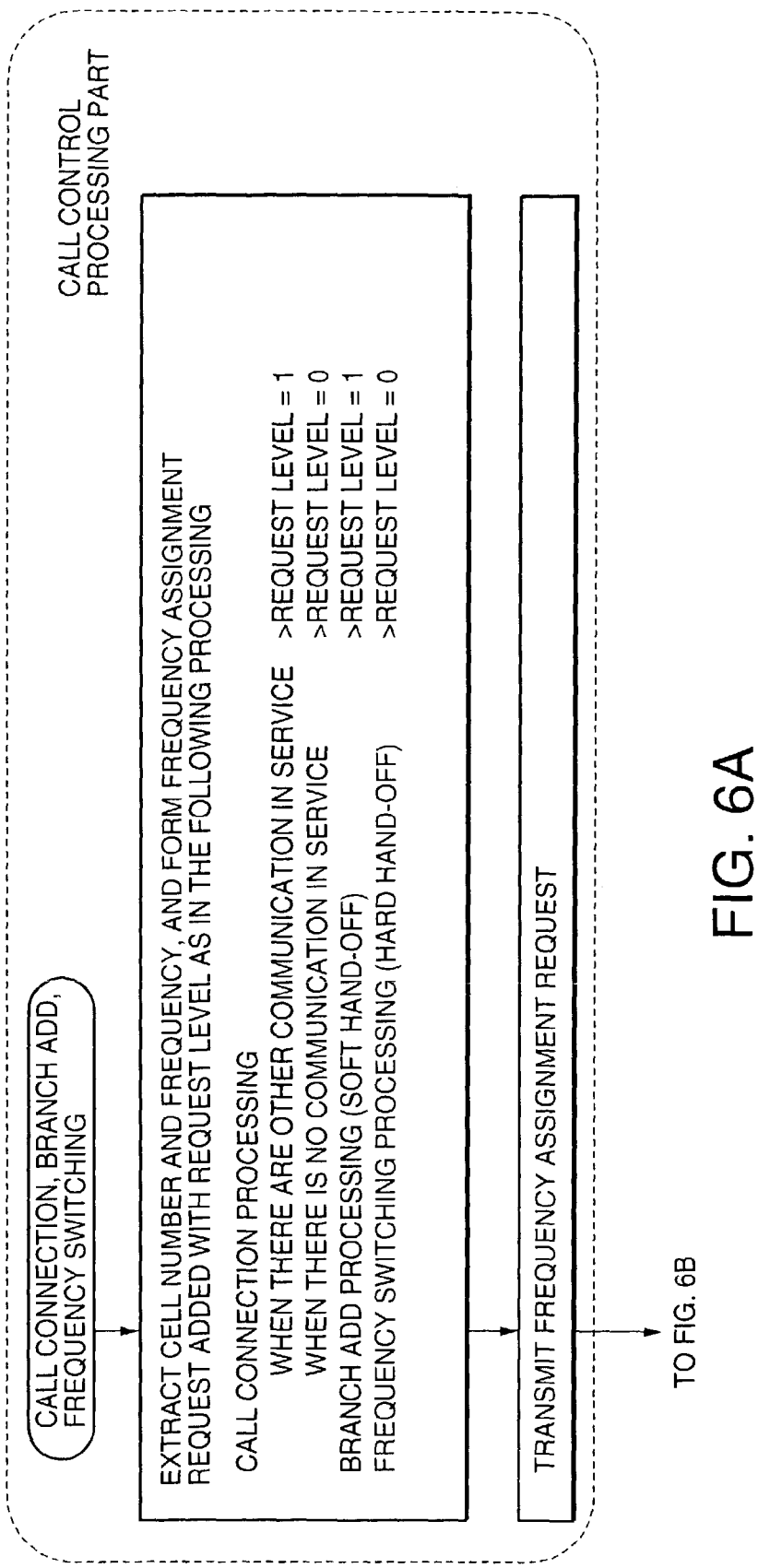
FIG. 6A is a diagram showing a flow until transmission of a frequency assignment request of frequency assignment processing according to the first embodiment of the present invention.
Figure 6B:
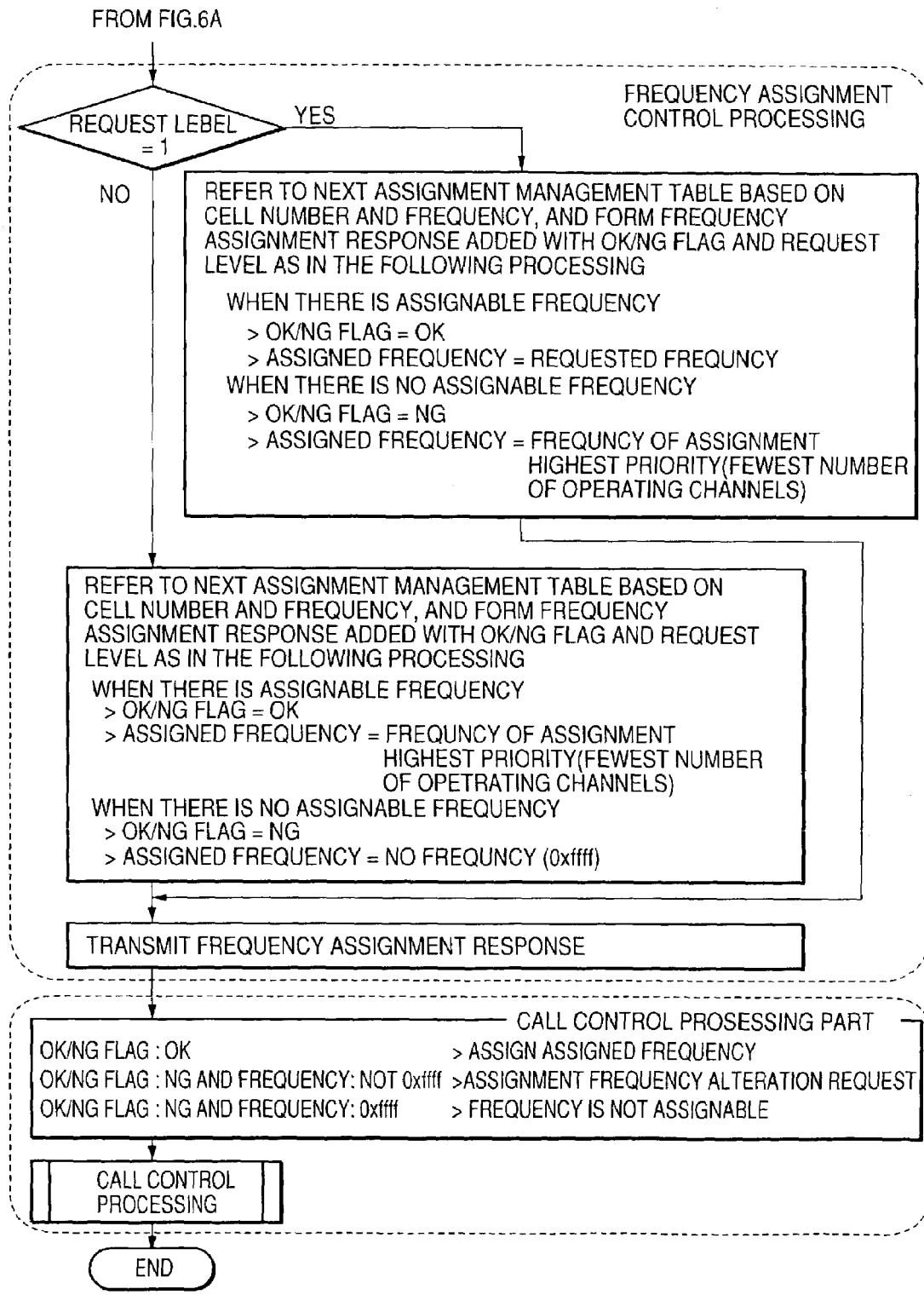
FIG. 6B is a diagram showing a flow corresponding to the frequency assignment processing and a response thereof according to the first embodiment of the present invention.

First, the mobile communication system and the load distribution method of multiple frequencies in this system according to a first embodiment of the present invention will be described referring to FIG. 3, or FIGS. 6A and 6B.

Figure 3:
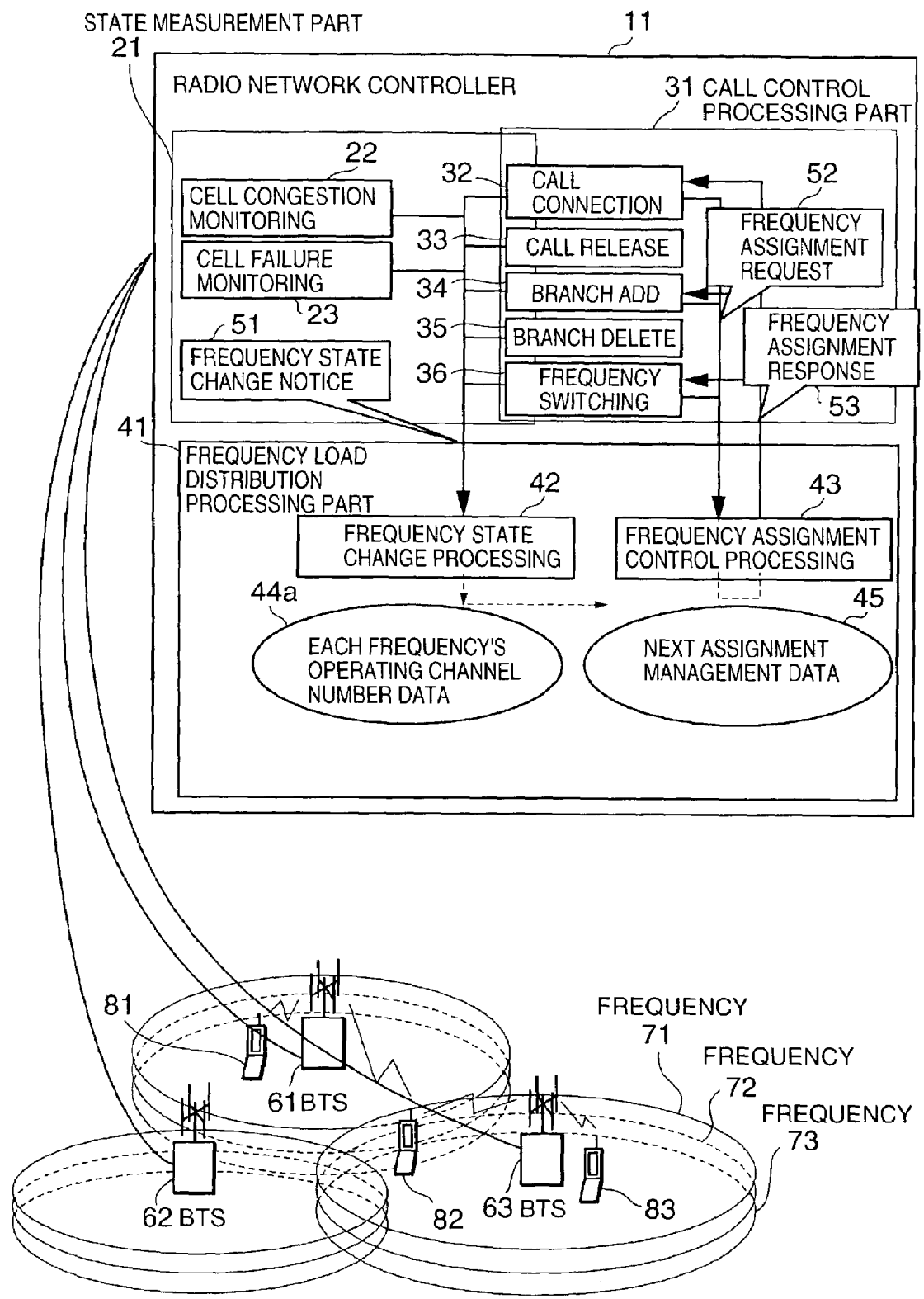
FIG. 3 is a diagram showing a configuration of a mobile communication system according to a first embodiment of the present invention.

FIG. 3 is a diagram showing a configuration of the CDMA mobile communication system and a flow of load distribution processing of multiple frequencies according to the first embodiment of the present invention.

Each BTS 61, BTS 62, and BTS 63 has three carrier frequency bands of a frequency 71, a frequency 72, and a frequency 73. In each of the frequencies, respectively different pilot signals are transmitted.

Each of mobile units 81 to 83 in the CDMA system is able to use the frequencies 71 to 73 as a carrier frequency and has a Pilot search function for different frequencies. The mobile units also have a function of negotiating with the radio network controller 11 over determination of the frequency to be used.

The radio network controller 11 has a function of reporting a frequency state change notice 51 from the state measurement part 21 to the frequency load distribution processing part 41 when the frequency state is changed by call control. In addition, the radio network controller 11 has a function of transmitting a frequency assignment request 52 and a frequency assignment response 53 for assigning a next frequency between the call control processing part 31 and the frequency load distribution processing part 41 when the call control processing part 31 is required to assign the frequency.

The state measurement part 21 extracts each element that changes the frequency from processing contents of call connection processing 32, call release processing 33, branch add processing 34, branch delete processing 35, and frequency switching processing 36 to form the frequency state change notice 51, then transmits it to the frequency load distribution processing part 41. The state measurement part 21 forms and transmits the same also when detecting the state change due to congestion/failure.

The call control processing part 31 transmits the frequency assignment request 52 added with current processing information to the frequency load distribution processing part 41 when setting a trunk and adding a branch, and assigns the frequency on the basis of the frequency assignment response 53 received from the frequency load distribution processing part 41.

The frequency load distribution processing part 41 comprises the frequency state change processing 42 and the frequency assignment control processing 43. In this embodiment, the frequency load distribution processing part 41 also holds each frequency's operating channel number data 44a and next assignment management data 45. The each frequency's operating channel number data 44a is composed of setting data of cells and respective operating frequency set values the radio network controller 11 holds. The frequency state change processing 42 updates the each frequency's operating channel number data 44a on the basis of the frequency state change notice 51 from the call control processing part 31, and also updates the next assignment management data 45 in accordance with the each frequency's operating channel number data 44a.

The frequency assignment control processing 43 derives an appropriate frequency in response to the frequency assignment request 52 from the call control processing part 31 on the basis of the current processing information added to the request and the next assignment management data 45, and returns the frequency assignment response 53.

Figure 4:
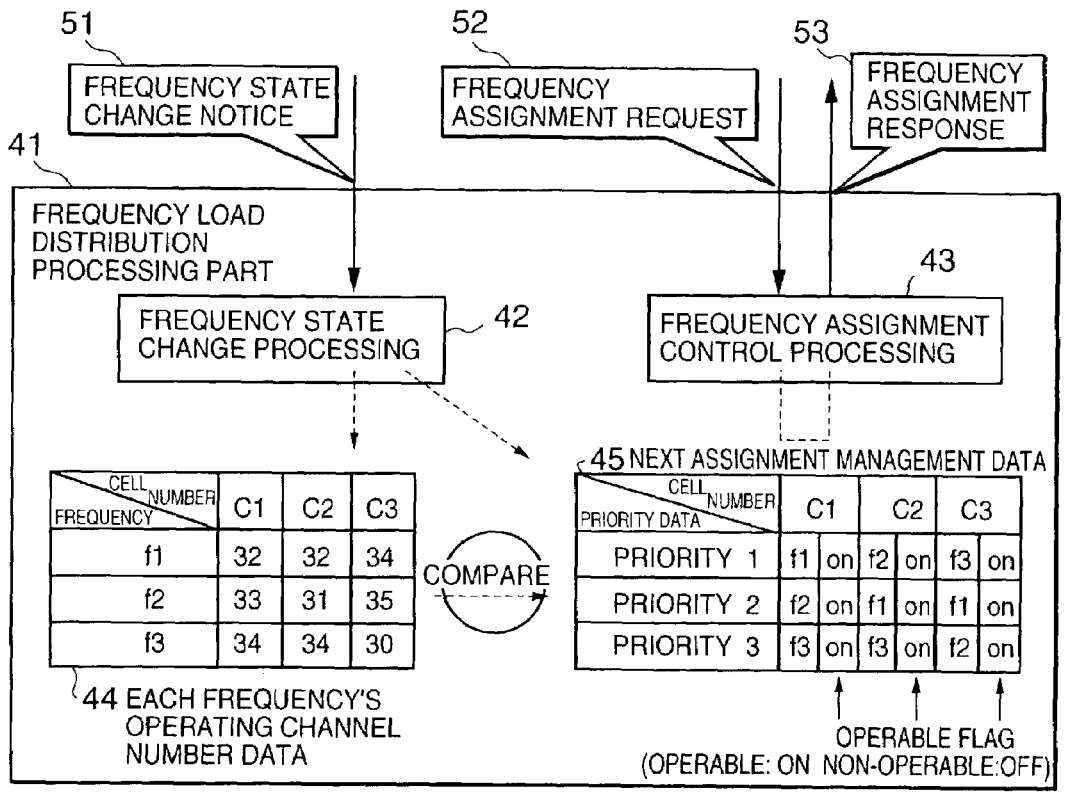
FIG. 4 is a diagram showing a specific configuration of a load distribution processing part according to the first embodiment of the present invention.

FIG. 4 is a diagram showing a specific configuration of the frequency load distribution processing part 41 of FIG. 3.

In FIG. 4, the frequency state change notice 51 is merely required to update the each frequency's state data and therefore does not need to have a fixed format thereof, however, for simple explanation, a format is used herein, in which one block comprises a BTS number, frequency, and increase/decrease number of channels, and the number "x" of changes defined as a total number of blocks is added to the top.

The frequency state change processing 42 updates the each frequency's operating channel number data 44a in accordance with the received frequency state change notice 51. At this time, the frequency state change processing 42 also writes the frequency with less number of channels into the next assignment management data with regard to the updated BTS so that the frequency may promptly be determined on the frequency assignment.

The call control processing part 31 of FIG. 3 transmits the frequency assignment request 52 added with the BTS number, a request level, and the frequency, at the time of each call connection processing 32, branch add processing 34, and frequency switching processing 36.

The request level of the frequency assignment request 52 is used when a specific frequency is requested in the call control processing part 31. In this embodiment, there are two request levels ("0" for NO REQUEST and "1" for REQUEST EXIST), where call connection originating from no communication state is indicated by "0" and branch addition by soft hand-off is indicated by "1".

The frequency assignment control processing 43 determines the request level and returns OK/NG of the frequency assignment and the frequency to be assigned as the frequency assignment response 53. The frequency assignment control processing 43 is asynchronous to the frequency state change processing 42. Therefore, even in the case of frequency assignment NG, a value of another assignable frequency is returned together with the frequency assignment response 53.

The constitution of this embodiment has been described above in detail, where basic call control processing of the call control processing part 31 in FIG. 3 is general processing and is not directly related with the present invention, so detail constitution thereof will be omitted.

In the above embodiment, each frequency's operating channel number data collected in traffic information processing may alternatively be used. Also, when the next assignment management data 45 is formed by using neighboring cell operating frequency data and thereby considering each frequency's operating channel number data of neighboring cells, frequency load distribution processing involving the neighboring cells may be attained.

Figure 5A:
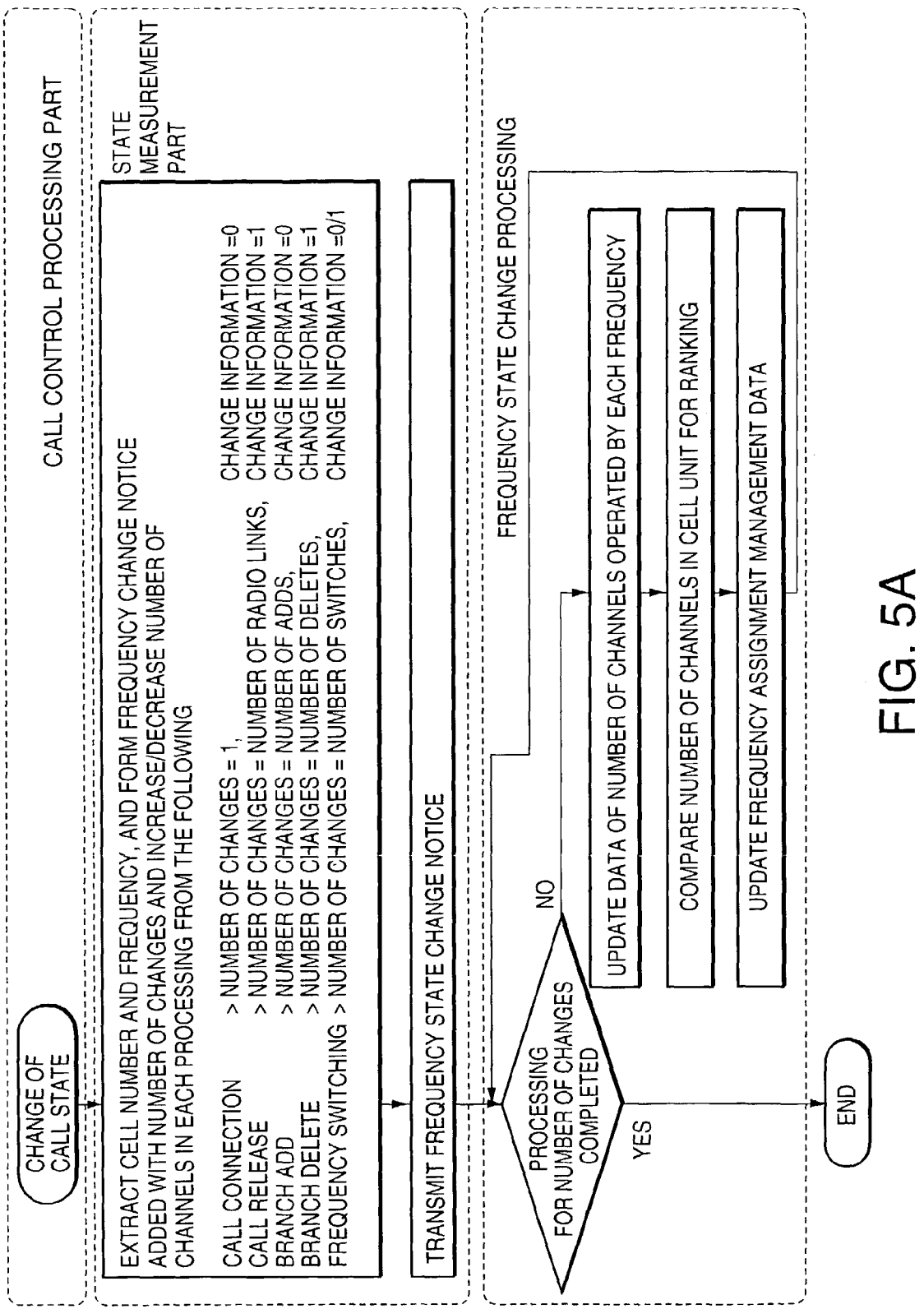
FIG. 5A is a diagram showing a flow corresponding to changes in a call state of frequency state change processing according to the first embodiment of the present invention.
Figure 5B:
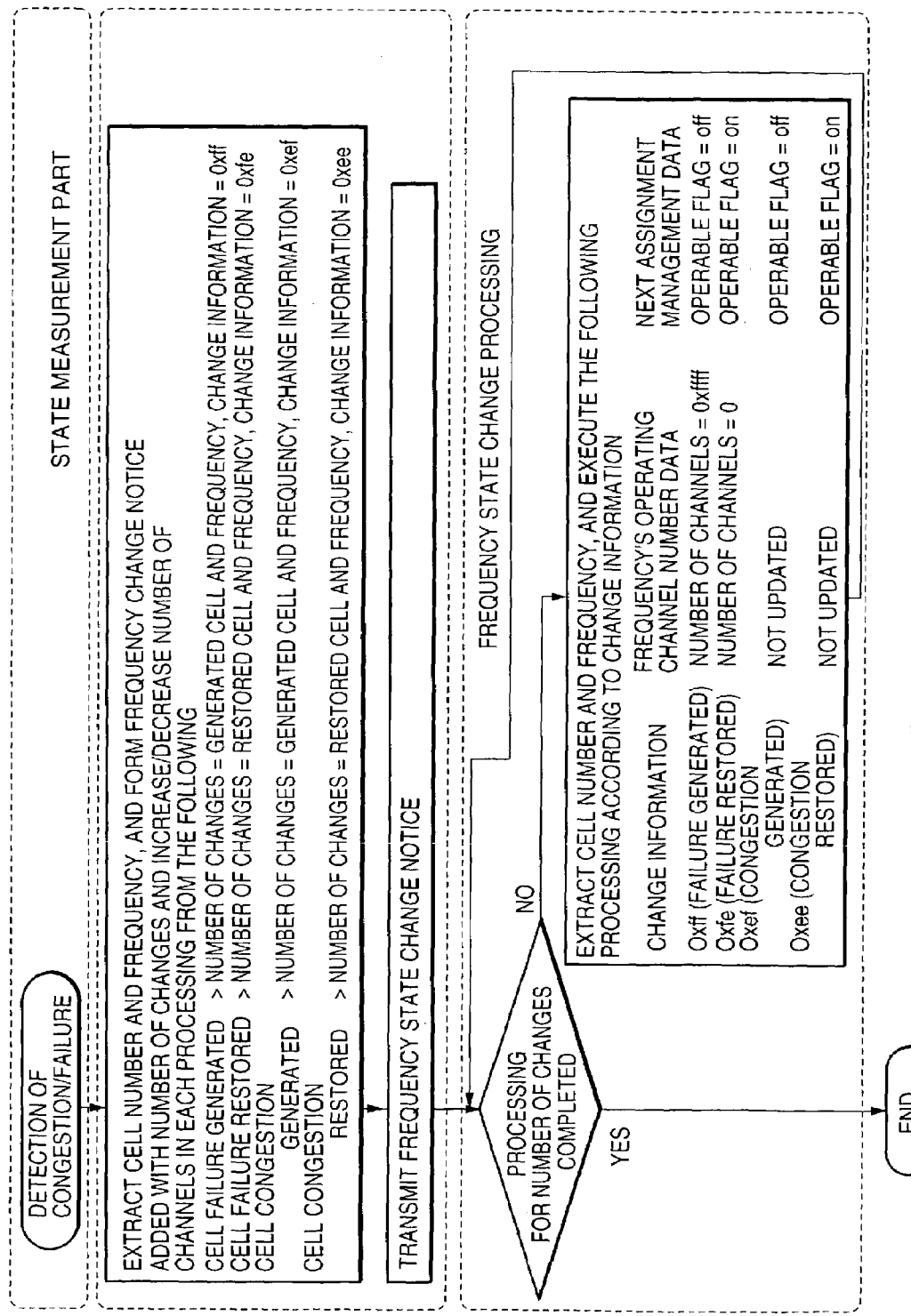
FIG. 5B is a diagram showing a flow corresponding to detection of congestion/failure of the frequency state change processing according to the first embodiment of the present invention.

Next, the description will be made referring to FIGS. 5A and 5B together with FIGS. 3 and 4. FIGS. 5A and 5B are flowcharts showing the frequency state change processing.

Call processing change measurement is a function executed in each call processing, whereby the frequency state change notice 51 is formed by the number of changes and change information in every processing and the corresponding cell number and frequency, and is transmitted to the frequency state change processing 42. In the call connection processing, the number of changes is indicated by "1" since the number of activated cell and frequency is one, and change information is indicated by "0" since the number of operating channels increases. In the case of cell failures, the number of changes is indicated by the number of cells and frequencies having failures, and change information is indicated by "0xff" in an occurrence and indicated by "0xfe" in a restoration.

The frequency state change processing 42 reads out the number of changes to update the each frequency's operating channel number data 44a the read-out number of times, and compares the number of operating channels among those of available frequencies for ranking to thereby update the next assignment management data 45. In the case of the call connection processing, the frequency state change processing 42 increments the number of operating channels of the corresponding cell and frequency by the number of changes, compares the changed cell to others in order for ranking, and updates the next assignment management data 45.

In the case that the change information indicates the occurrence of cell failures, the each frequency's operating channel number data 44a of the corresponding cell and frequency is indicated by "0xffff". In addition, an operable flag of the corresponding cell and frequency in the next assignment management data is set to "OFF". In the case that the change information indicates the restoration of cell failures, the each frequency's operating channel number data 44a of the corresponding cell and frequency is initialized as "0", and the number of operating channels is compared for ranking, also the operable flag in the frequency assignment management data is set to "ON", followed by an update of assignment orders. When the frequency congestion occurs, the operable flag in the next assignment management data is set to "OFF" while the each frequency's operating channel number data 44a is still the same because a congestion notice does not make the number of operating channels increase and decrease.

Next the description will be made with reference to FIGS. 6A and 6B together with FIGS. 3 and 4. FIGS. 6A and 6B is a flowchart showing the frequency assignment control processing.

The call control processing part 31 forms a cell number to be assigned at the time of channel assignment processing in each call control and the frequency assignment request 52 composed of the request level and desired frequency to be assigned in accordance with each processing, and transmits them to the frequency assignment control processing 43. In the case of the call connection originating from no communication state or of hard hand-over, the request level is "0" since there exists no requested frequency. In the case of the call connection when there exist other communications in service or of soft hand-over, it is desirable to utilize the same frequency band as that now in use, so that the request level is "1" and the frequency currently being used is utilized.

When the request level is "1", the frequency assignment control processing 43 determines whether the corresponding cell and frequency are operable or not in accordance with the assignment management table. When the cell and frequency are "OK" which means to be operable, the frequency assignment control processing 43 transmits the frequency assignment response including the requested frequency. When the corresponding cell and frequency are "NG" which means to be non-operable, the frequency assignment control processing 43 transmits the response including the highest priority-assignment frequency. When the request level is "0" and there exists the assignable frequency, the frequency assignment control processing 43 determines as being "OK" and transmits the request including the highest priority-assignment frequency, whereas the frequency assignment control processing 43 determines as being "NG" and transmits the frequency of "0xffff", when there exists no assignable frequency.

Second Embodiment

Next, the mobile communication system and the load distribution method of multiple frequencies in the system according to a second embodiment of the present invention will be described with reference to FIG. 7 and FIGS. 8A and 8B.

The basic constitution in this embodiment is identical to that of the foregoing first embodiment, and a function of measuring the frequency state of the base station and the radio network has been further devised in this embodiment. The constitution thereof is shown in FIG. 7.

Figure 7:
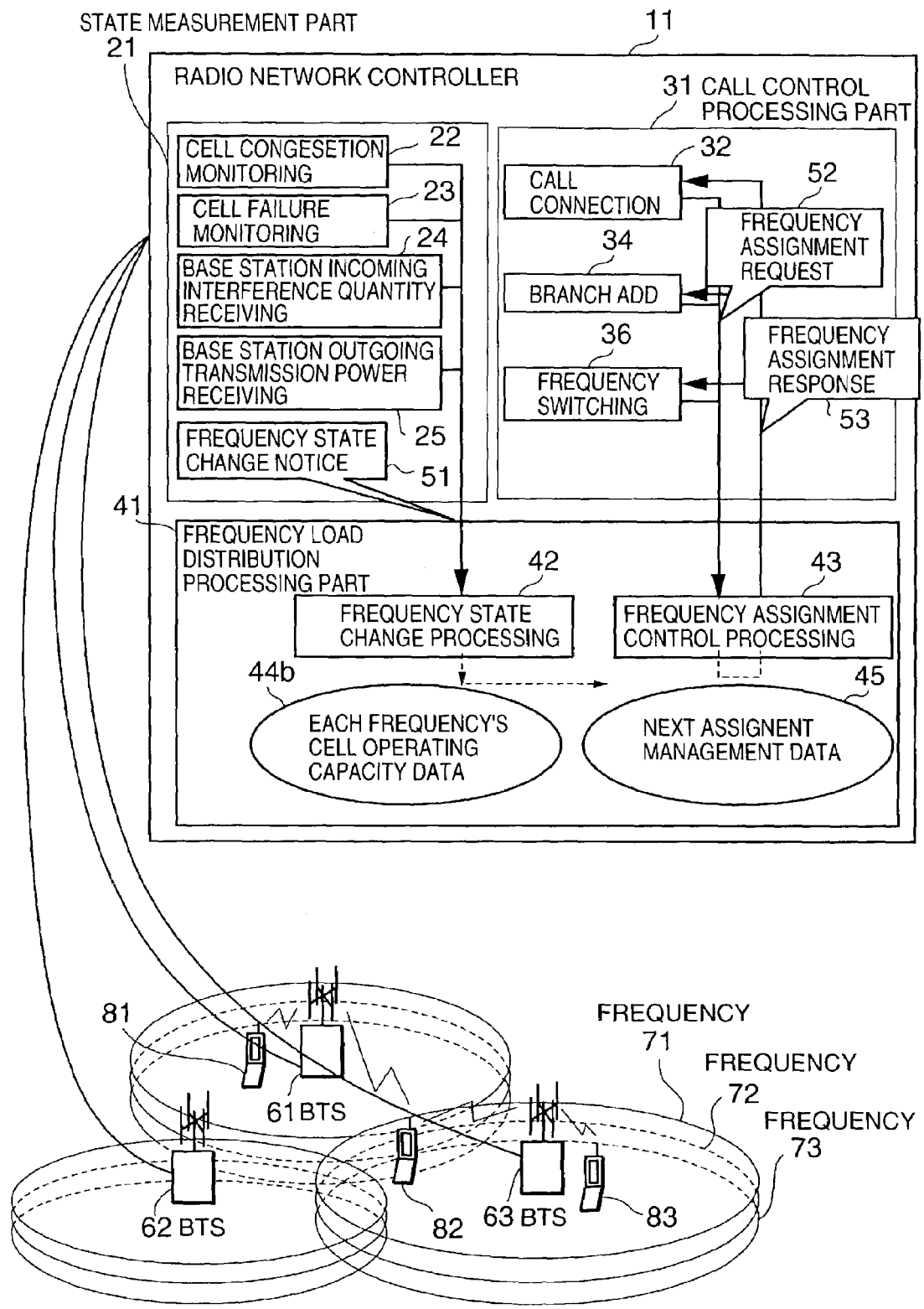
FIG. 7 is a diagram showing a configuration of a mobile communication system according to a second embodiment of the present invention.

In FIG. 7, each of the BTS61, BTS62, and BTS63 has a function of measuring an incoming interference quantity and an outgoing total transmission power against multiple frequencies and notifying the radio network controller 11 of them.

When the radio network controller 11 receives the incoming interference quantity and the outgoing total transmission power notified from the base station, the state measurement part 21 forms the frequency state change notice 51 on the basis of the information of the incoming interference quantity and the outgoing total transmission power and then transmits it to the frequency lod distribution processing part 41.

The frequency load distribution processing part 41 updates each frequency's cell operating capacity data 44*b* comprising the incoming interference quantity, the outgoing total transmission power, and an incoming and outgoing total value, and forms the next assignment management data 45 on a service-by-service basis according to the each frequency's cell operating capacity data 44*b*.

Figure 8A:
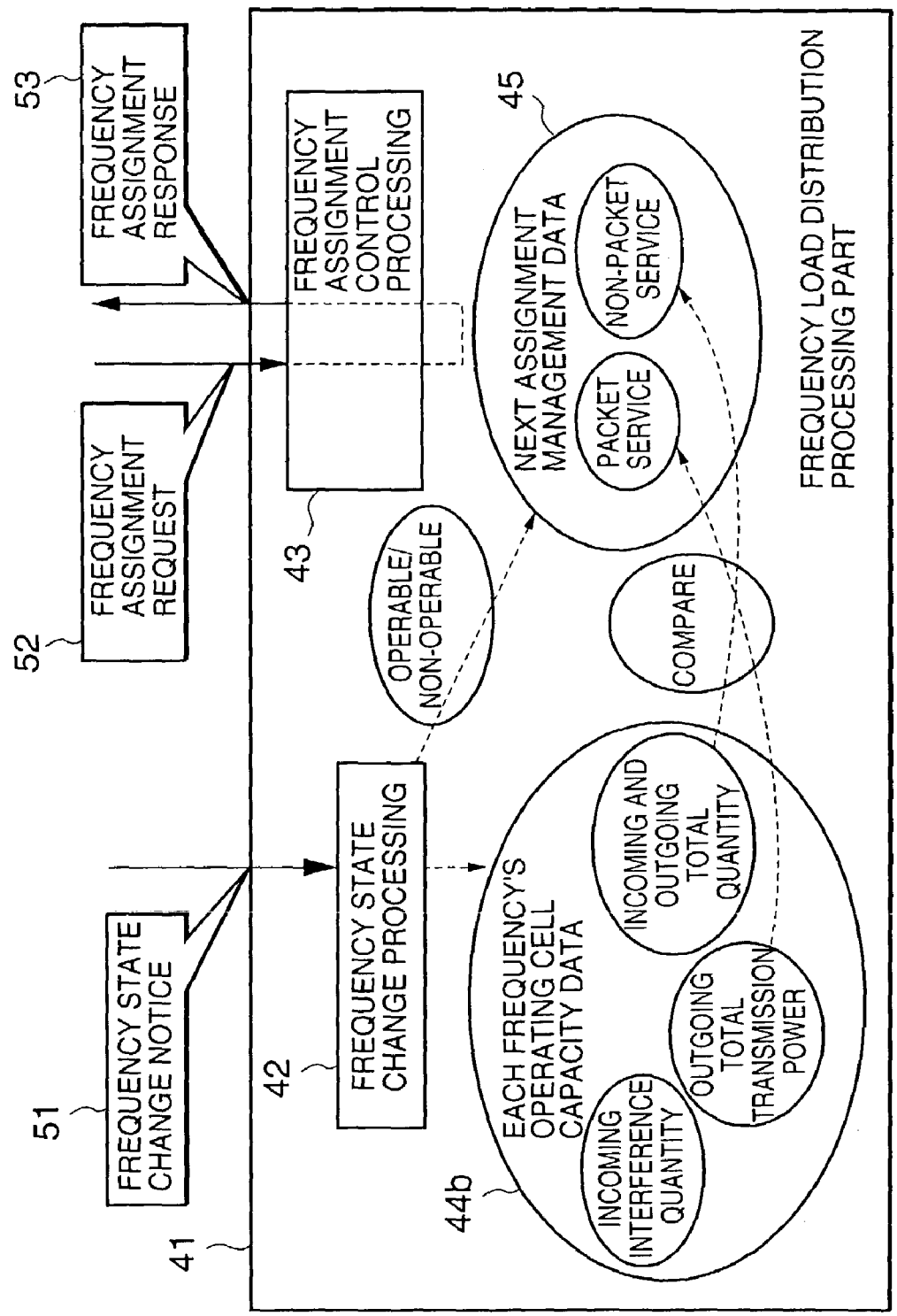
FIG. 8A is a diagram showing a specific configuration of a load distribution processing part according to the second embodiment of the present invention.

FIGS. 8A and 8B are diagrams showing a specific configuration of the frequency load distribution processing part shown in FIG. 7.

In FIGS. 8A and 8B, the frequency state change notice 51 is merely required to update the each frequency's state data and therefore does not need to have a fixed format thereof. However, for simple explanation, a format is used herein, in which one block comprises a cell number, frequency, incoming interference quantity, outgoing total transmission power, and state notice, and the number "x" of changes defined as the total number of blocks is added at the top.

The frequency state change processing 42 updates the each frequency's cell operating capacity data 44*b* in accordance with the received frequency state change notice 51. With the updated cell, the frequency state change processing 42 arranges frequencies into the next assignment management data of packet service in an ascending order of the total transmission power, and also arranges frequencies into the next assignment management data of non-packet service in an ascending order of the incoming and outgoing total values.

The call control processing part 31 transmits the frequency assignment request 52 added with a BTS number (cell number), request level, frequency, and a type of service, in each of the call connection processing 32, branch add processing 34, and frequency switching processing 36. In this embodiment, packet service is defined as "0", and non-packet service as "1".

The frequency assignment control processing 43 is the same as that of the first embodiment in the basic processing, but different in that data is referred based on types of services.

In this embodiment, the assignment frequency is managed in accordance with the incoming interference quantity and outgoing total transmission power, which thus provides an advantage that the frequency loads may be distributed so as to equalize allowable capacities of each cell. Furthermore, the assignment management data is prepared for each type of services, which also provides an advantage that the frequency loads may be distributed so as to restrain a deviation of incoming and outgoing allowable quantities.

As described above, according to the mobile communication system and the load distribution method of multiple frequencies in the system, the frequency is assigned on the basis of a state thereof, so that a first advantage that loads in each frequency band are distributed may be obtained. Moreover, the loads are thus distributed to frequencies, so that a second advantage that deterioration in service quality due to congestion generated only in a specific frequency is effectively prevented may also be obtained.

What is claimed is:

1. A mobile communication system of a CDMA or W-CDMA system which comprises a mobile unit, a base station having a plurality of carrier frequency bands, and a radio network controller controlling the base station, wherein
the radio network controller comprises a state measurement part, a call control processing part, and a frequency load distribution processing part, and
the frequency load distribution part comprises:
frequency state change processing means for updating preformed each frequency's state data and next assignment management data by referring to a frequency state change notice transmitted from the state measurement part; and
frequency assignment control processing means for, in response to a frequency assignment request added with current processing information that is transmitted from the call control processing part, selecting a frequency by referring the updated next assignment management data and returning a frequency assignment response,
wherein the frequency assignment suppresses a state of switching carrier frequencies at a time of moving into neighboring cells.

2. The mobile communication system according to claim 1, wherein the state measurement part extracts elements that change the frequency from processing contents of basic call controls including call connection, call disconnection, branch addition, branch deletion, and frequency switching in the call control processing part, and forms the frequency state change notice by referring to at least the extracted elements.

3. The mobile communication system according to claim 2, wherein each frequency's operating channel number data is used as the each frequency's state data.

4. The mobile communication system according to claim 1, 2, or 3, wherein the state measurement part comprises means for receiving an incoming interference quantity and an outgoing transmission power against multiple frequencies from the base station, and forms the frequency state change notice by referring to the incoming interference quantity and the outgoing transmission power received by the receiving means.

5. The mobile communication system according to claim 1, wherein the state measurement part extracts elements that change a frequency from processing contents of basic call controls including call connection, call disconnection, branch addition, branch deletion, and frequency switching in the call control processing part, forms the frequency state change notice by referring to at least the extracted elements, uses each frequency's operating channel number data as the each frequency's state data, comprises means for receiving an incoming interference quantity and an outgoing transmission power against multiple frequencies from the base station, forms the frequency states change notice by referring to the incoming interference quantity and the outgoing transmission power received by the receiving means, and uses each frequency's cell capacity data including the incoming interference quantity, the outgoing transmission power, and an incoming and outgoing total value calculated by a prescribed expression may be used as the each frequency's state data.

6. The mobile communication system according to claim 5, wherein the frequency load distribution processing part manages frequency assignment on an incoming and outgoing basis by using the incoming interference quantity, the outgoing transmission power, and the incoming and outgoing total value.

7. A load distribution method of multiple frequencies in a CDMA or W-CDMA mobile communication system which comprises a mobile unit, a base station having a plurality of carrier frequency bands, and a radio network controller controlling the base station, wherein the radio network controller executes at least the following steps of:

forming a frequency state change notice based on state changes of a frequency;

updating pre-formed each frequency's state data by referring to the frequency state change notice;

updating pre-formed next assignment management data by referring to the updated each frequency's state data;

selecting the frequency by referring to the updated next assignment management data and returning a frequency assignment response when a frequency assignment request added with current processing information is transmitted from a call control processing part; and assigning the frequency by referring to the frequency assignment response, wherein the frequency assignment suppresses a state of switching carrier frequencies at a time of moving into neighboring cells.

8. The load distribution method of multiple frequencies according to claim 7, wherein the step of forming the frequency state change notice comprises a step of extracting elements that change the frequency from processing contents of basic call controls including call connection, call disconnection, branch addition, branch deletion, and frequency switching, and a step of referring to at least the extracted elements to form the frequency state change notice.

9. The load distribution method of multiple frequencies according to claim 8, each frequency's operating channel number data is used as the each frequency's state data.

10. The load distribution method of multiple frequencies according to claim 7, 8, or 9, wherein the radio network controller further executes a step of receiving an incoming interference quantity and an outgoing transmission power against multiple frequencies from the base station to thereby form the frequency state change notice by referring to the incoming interference quantity and the outgoing transmission power received in the receiving step.

11. The load distribution method of multiple frequencies according to claim 10, wherein each frequency's cell capacity data including the incoming interference quantity, the outgoing transmission power, and an incoming and outgoing total value calculated by a prescribed expression is used as the each frequency's state data.

12. The load distribution method of multiple frequencies according to claim 11, wherein the step of updating the next assignment management data comprises a step of managing frequency assignment on an incoming and outgoing basis by using the incoming interference quantity, the outgoing transmission power, and the incoming and outgoing total value, and a step of managing next assigned frequencies in accordance with types of services.

\* \* \* \* \*